April 6, 1948. W. H. MARSH 2,438,935
TEMPERATURE COMPENSATED METER
Original Filed Dec. 8, 1938 4 Sheets-Sheet 1

INVENTOR.
Walter H. Marsh.
BY Lewis D. Konigsford
ATTORNEY.

April 6, 1948. W. H. MARSH 2,438,935
TEMPERATURE COMPENSATED METER
Original Filed Dec. 8, 1938 4 Sheets-Sheet 4

INVENTOR.
Walter H. Marsh.
BY Lewis D. Konigsford
ATTORNEY.

Patented Apr. 6, 1948

2,438,935

UNITED STATES PATENT OFFICE 2,438,935

TEMPERATURE COMPENSATED METER

Walter H. Marsh, Crafton, Pa., assignor to Rockwell Manufacturing Company, a corporation of Pennsylvania Continuation of application Serial No. 244,596, December 8, 1938. This application June 28, 1943, Serial No. 492,541

26 Claims. (Cl. 73—233)

The present invention relates to an improvement in fluid meters, and relates particularly to fluid meters of the positive type driving a register which embodies thermal responsive means between the meter and register for compensating the register from standard calibration for variations in the temperature of the fluid being measured. This application is a continuation of my application, Serial No. 244,596, filed December 8, 1938, for Temperature compensated meter, which has become abandoned and which is a continuation in part of my application for Compensated register drive, Serial No. 34,046, filed July 31, 1935, now Patent 2,191,766, granted February 27, 1940.

In the measuring of petroleum products transported by pipeline, it heretofore has been the practice to employ drawoff tanks at the various takeoff points, which involved careful timing of temperature readings at the intake and drawoff points. This system of measurement made impossible the interconnecting of pipelines and its obvious economies.

The measurement of flow in pipelines involves a number of problems, and was not practicable even after meters of suitable capacity and of sufficient ruggedness were developed for this purpose, because of the difficulties of temperature compensation. The range of temperature change encountered may be as great as 50° F. and the speeds of operation of the meters may vary from about 25 to 300 revolutions per minute. The temperature compensating mechanism, together with the meter, accordingly must be accurate within plus or minus two per cent throughout this range of operation, and the installation must be durable, compact, trouble-free, and wear of parts must not change the accuracy in such a way as cannot be compensated for by the adjustment of the mechanism. The mechanism also should be readily accessible for servicing or repair or replacement. Heretofore, no temperature compensated mechanism had been developed to meet these requirements.

It is an object of my invention to provide a fluid meter which will accurately measure the volume of fluid and automatically compensate for variations in temperature of the fluid from a given standard.

A further object is the provision of a fluid meter embodying a thermal compensation which is durable, inexpensive to manufacture, is easily adjusted, is very accurate, and can be readily adapted to various types of meters or registers now commercially available.

According to the present invention, a variable drive means is provided between the meter and register, and temperature responsive means is provided for varying the drive means to correct for changes in temperature of the fluid being measured. In the preferred embodiment of my invention I provide any suitable drive means operatively connecting the register and meter, which may, if desired, be a one way drive means, and I employ one way drive means to over-drive the register when operated in one direction, said one way drive means being adjustable by any suitable temperature responsive element for varying the extent of operation thereof. A manual adjustment also is provided which may be used in initially calibrating the apparatus.

The invention will be described by way of example in connection with a liquid meter and register, reference being made to the accompanying drawings, wherein preferred embodiments of the invention are shown by way of illustration and in which.

Figure 1:
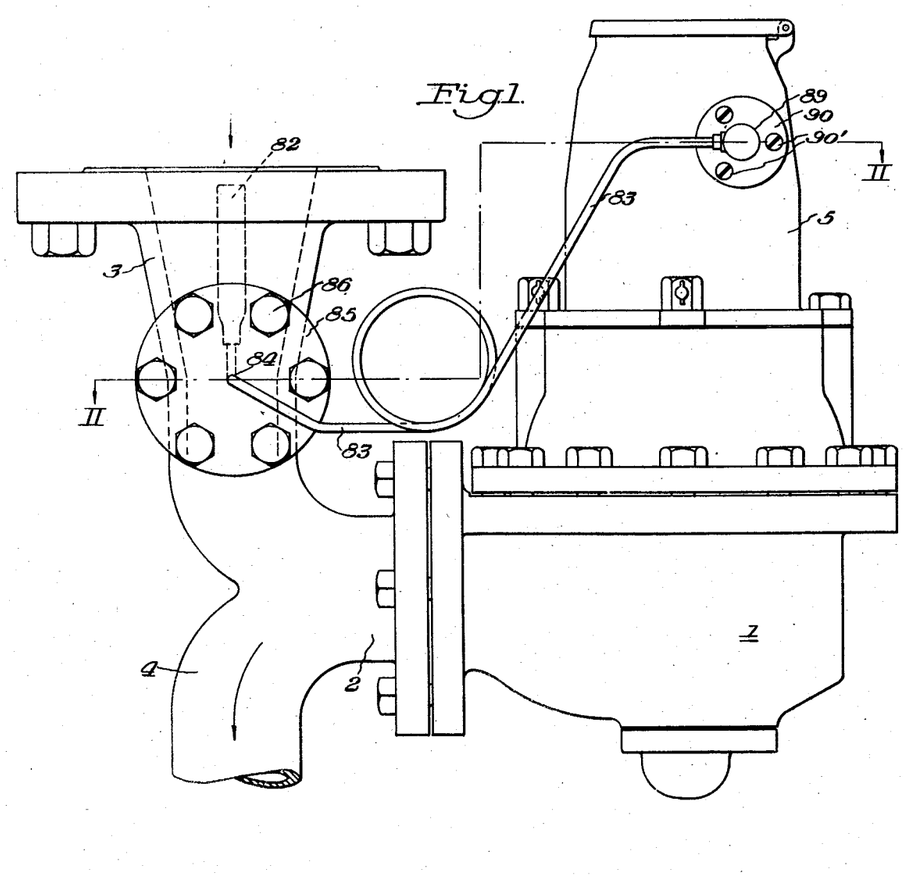
Figure 1 is a side elevation of a preferred embodiment of the invention.

Referring to Figure 1 of the drawing, there is shown a meter 1 of any suitable construction having a manifold 2 providing an inlet connection 3 and an outlet connection 4 thereon. Preferably the meter is constructed similar to that disclosed in the application of Walter H. Marsh, Serial No. 179,394, filed December 13, 1937, Patent 2,274,206, granted February 24, 1942. A register case 5 is bolted or otherwise secured to the meter and contains the register mechanism adapted to be driven thereby.

Figures 2, 3, 4:
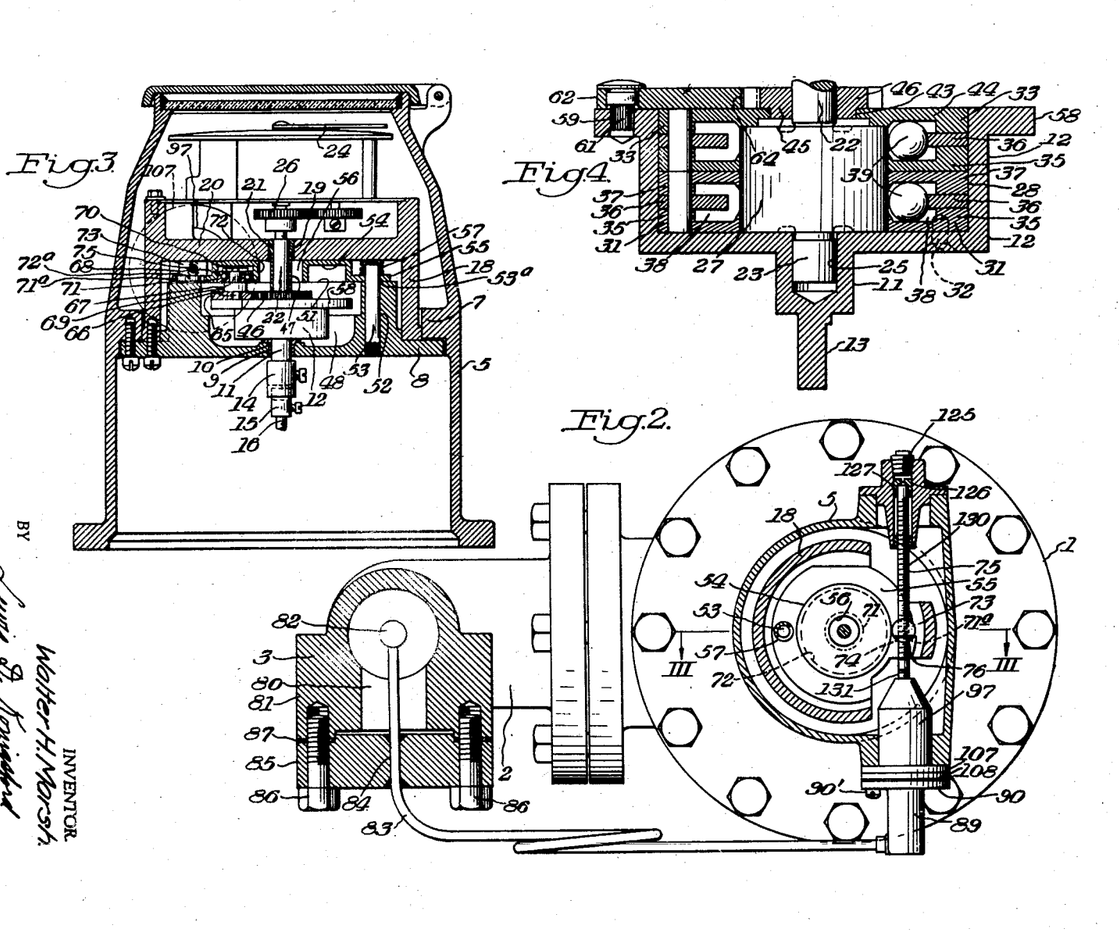
Figure 2 is a sectional view of Figure 1 taken on line II—II.
Figure 3 is a vertical sectional view of the register drive means.
Figure 4 is a diametrical sectional view through a part of the driving means shown in Figure 3.

As shown in Figure 3, register housing 5 has an internal flange 7 to which is secured a bottom plate 8 for supporting the register mechanism. The plate 8 is bored centrally at 9 to receive a bushing 10 in which is journalled the hub 11 of a driving member 12. The driving member 12 has a flattened end 13 (Figure 4) adapted to receive thereon one half 14 of a coupling member held thereon by a set screw, the other half 15 of the coupling member being secured to the shaft 16 to be driven by the meter through the intermediary of change gears, if desired. The coupling preferably is of the Oldham type, although any suitable coupling means may be employed.

Figures 5, 6, 7, 12:
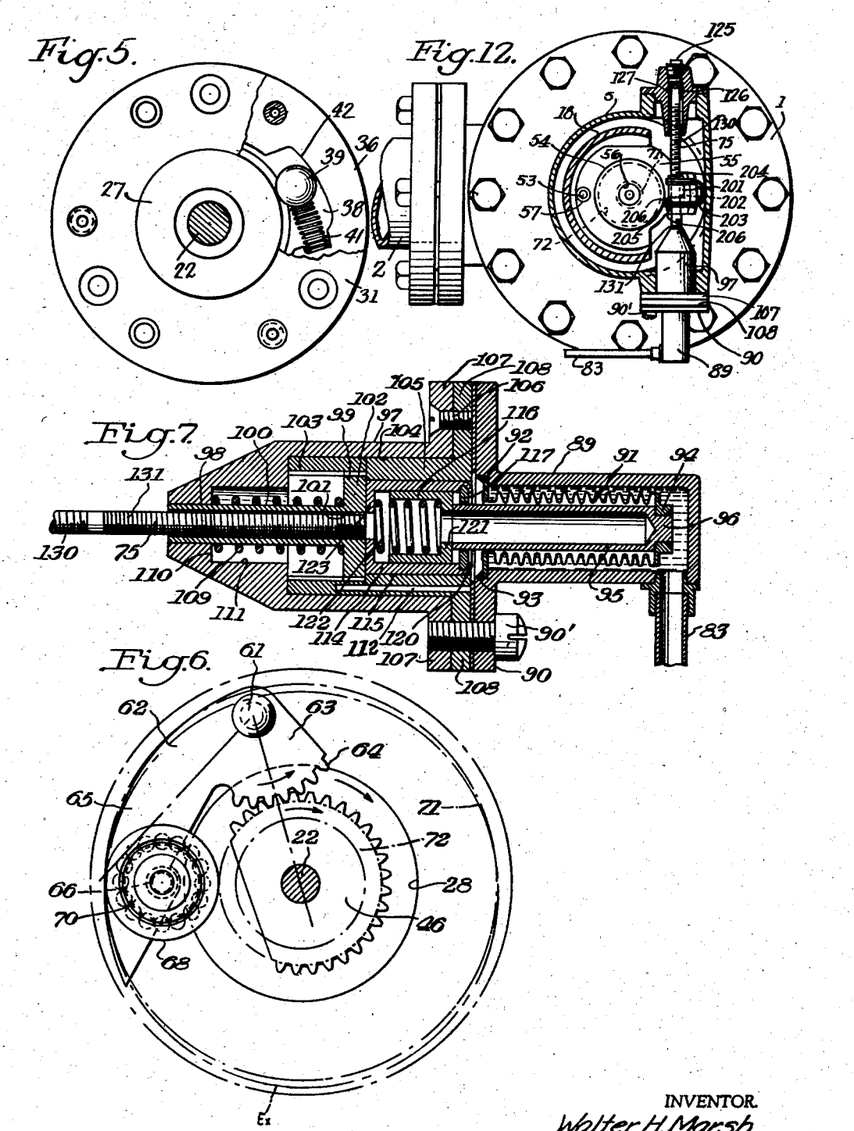
Figure 5 is an elevation with parts broken away of the preferred one way drive means.
Figure 6 is a plan view of the adjustable drive assembly with the cam track shown in dot and dash lines.
Figure 7 is a diametric section of a portion of the temperature responsive means.
Figure 12 is a sectional view similar to Figure 2 of a modification employing ambient temperature compensation.
Figure 8:
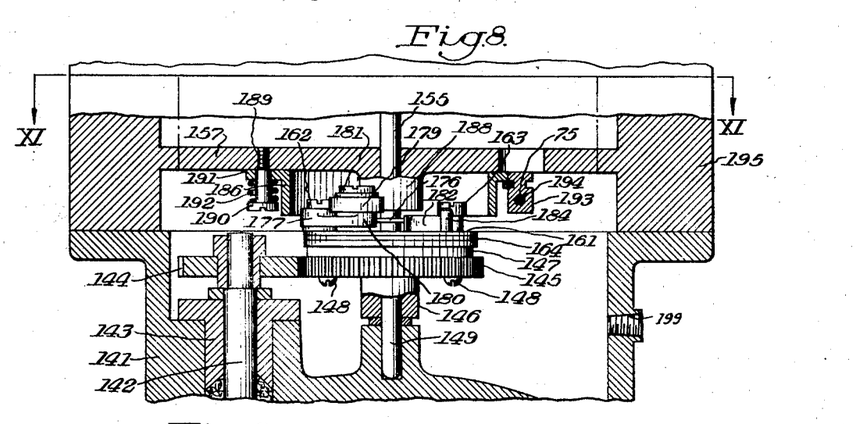
Figure 8 is a side elevation of a modification, the casing being in section.
Figure 9:
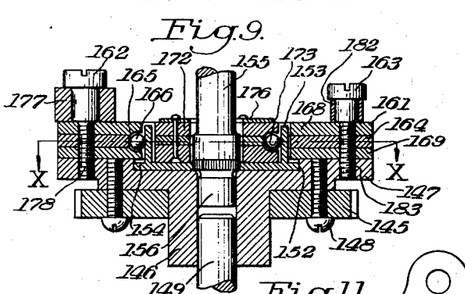
Figure 9 is a vertical diametrical section of the modification shown in Figure 8.
Figure 10:
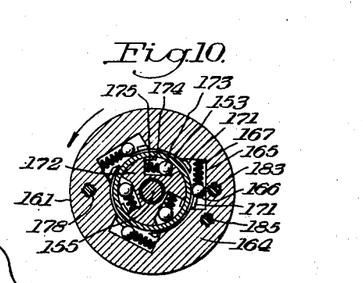
Figure 10 is a horizontal section taken on line X—X of Figure 9.
Figure 11:
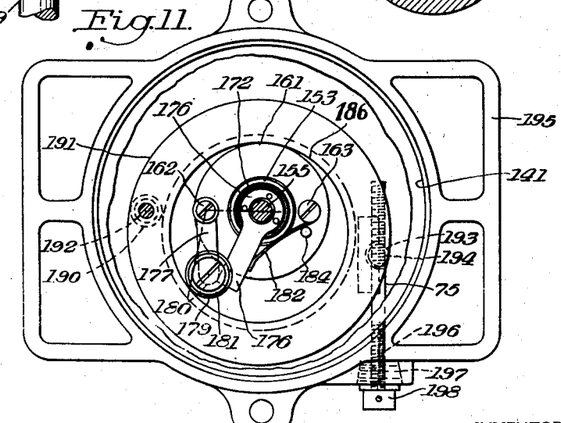
Figure 11 is a plan view of the mechanism shown in Figure 8, with parts broken away.

The housing 18 is bolted or otherwise suitably secured to the plate 8 and has a central bore 19 in the top wall 20 with a bushing 21 in the bore, and one end 22 of an adjustment shaft is journalled in this bushing, the other end 23 (Figure 4) of this shaft being journalled in a recess 25 in the driving member 12. A register 24 of any suitable type is driven by the adjustment shaft through suitable gearing 26. The adjustment shaft has an enlarged portion 27 constituting a clutch drum, and the driving member is recessed at 28 to receive a multiple one way drive assembly. The preferred construction of the one way drive assembly is shown in Figures 4 and 5 and comprises a lower ball clutch driving member 31 surrounding the drum 27 and secured to the driving member 12 by screws or in any other suitable manner, and an upper ball clutch driving member 33 surrounding the drum and freely rotatable in the recess. The ball clutch driving members may be of any suitable construction, and in the preferred embodiment clutch member 31 comprises a plurality of clutch discs 35, 36, and 37 riveted together and having recesses 38 therein in which are located hardened steel balls 39 urged inwardly by a suitable spring 41. The circumferential wall 42 of the recess is inclined toward the center so that when the clutch member is turned clockwise, as viewed in Figure 5, the ball is wedged between the clutch drum 27 and recess wall 42 to grip and rotate the drum, and when the clutch is rotated in the opposite direction the balls idle over the clutch drum. Any desired number of such balls may be provided, and it will be apparent that they may be regarded singly or jointly as a one way drive means. The upper ball clutch assembly 33 is similarly constructed so that when said assembly is caused to rotate clockwise relative to clutch member 31 it drives drum 27 clockwise. The top plate 44 of the upper clutch member has an opening 43 which receives the hub 45 of a gear 46, the hub being suitably secured therein, as by peening the ends of the hub or in any other suitable manner. A spacer sleeve 47 on driven shaft 22 abuts the bushing 21 and gear 46 and prevents the clutch member 33 from rising out of place.

The plate 8 has a hollow hub portion 48 terminating in a substantially plane surface 51 and is drilled at 52 to receive a pivot pin 53 which may be fluted at the lower end to hold it assembled. An adjustment cam 54 has a flange 55 which receives the pivot pin 53 in a close fitting bore 53a therein, said cam overlying the one way drive mechanism with the shaft 22 passing through a central opening 56 therein, and a spring 57 abutting the top wall 20 and the flange 55 holds the cam plate in position on face 51. The driving member 12 has a flange 58 at the top which is drilled at 59 and receives a pivot pin 61 therein. Preferably the portion of the pivot pin received therein is fluted so that when the pin is driven into place and the end peened over, it will be held securely in position.

A follower arm 62, Figures 4 and 6, is journalled on the pin 61 and has an arcuate portion 63 having gear teeth 64 therein which engage the gear teeth of the central gear 46. An extension 65 of the arm is bored at 66 to receive a stud 67 riveted therein, upon which is journalled a ball bearing roller 68, the inner race of which rests on a spacing flange 69, and a retaining washer 70 held in place by riveting the end of the pin holds the ball bearing roller in position. The cam 54 is recessed to provide two radially spaced tracks 71 and 72 which receive the roller 68 therebetween with a running clearance. Diametrically opposite hole 53a the cam flange 55 is slotted at 71a and receives a stud 72a having a head 73 which is transversely bored and threaded at 74 to receive threaded adjustment rod 75. This slot 71a enables the stud 72a to be moved in a straight path while track member 18 is adjusted in an arcuate path about pin 53 as a pivot. The head 73 may be split as indicated at 76 (Figure 2) so that one part may be sprung slightly with respect to the other so as to hold the rod 75 securely and prevent lost motion.

From the description so far pursued, it will be apparent that the meter drives the shaft 16 which, through the coupling member 14, 15 drives the driving member 12 in clockwise direction. The lower ball clutch driving member 31 rotates therewith and the balls 39 thereof wedge between the clutch drum 27 and recess wall 42 to grip and rotate the drum, while the drum idles over the balls of the upper clutch member 33. Follower arm 62 is pivoted on the driving member 12 to rotate therewith and when the tracks 71 and 72 of cam 54 are concentric with the clutch drum 27, the roller 68 therein moves in a true circle and the angle from the center of pin 61 subtended between the center of shaft 22 and the contact point of roller 68 with track 71 remains constant so that there is no relative angular movement between the gear teeth 64 on the follower arm and the central gear 46, and the shaft 22 is driven at the same speed as shaft 16. However, when the tracks 71 and 72 are adjusted so that they are not concentric with the clutch drum 27, as indicated by dot and dash line Ex, Figure 6, the roller 68 will move in an eccentric circle and the angle above referred to will gradually increase and decrease in a periodic cycle. During the portion of the rotation that the angle decreases, gear teeth 64 rotate about pivot pin 61 and thus turn central gear 46 and the top clutch member 33 with it in clockwise direction at a greater angular velocity than that of lower ball clutch 31, so that the clutch drum 27 is overdriven by the upper ball clutch driving member while the drum idles over the balls of the lower clutch driving member 31. During the portion of the rotation that the angle increases, the clutch drum 27 is driven by the lower ball clutch driving member 31 and the drum idles over the balls of the upper clutch member 33. It will be understood that it is of no consequence whether the apparatus is designed to produce an overdrive upon increase or decrease of the angle, this being merely a matter of location of the arm on driving member 12, disposition of the clutch members, and other mechanical details. The eccentricity of the cam tracks 71 and 72 may be adjusted by manually rotating the threaded rod 75 or bodily axially moving the rod, and in the construction shown this adjustment is accomplished by moving the rod bodily in response to a temperature responsive element. Means is also provided for manually rotating the rod to move the head 73 thereon and thus adjust the eccentricity of the cam member 54.

The construction of the automatic temperature compensation of the register now will be described. The inlet connection 3 of the meter manifold has a bore 80 therein (Figure 2) communicating with the interior, and a well 81 is formed surrounding this bore. The well may be integral with the inlet manifold or welded thereto. A bulb 82 containing a suitable fluid having a high co-efficient of thermal expansion, such as, for example, acetone, is located in the inlet connection and has a tube 83 connected therewith extending through the bore 80, and through the bore 84 in the cover 85. The tube 83 may be welded to the cover as shown, or secured thereto in any other suitable manner, the cover being secured in place by bolts 86, there being a gasket 87 interposed between the cover and well to prevent leakage.

The register housing 5 has a flanged cup 89 or housing (Figures 1, 2 and 7) secured thereto by means of screws 90' passing through suitable holes in the flange 90 thereof and threaded into the register housing, the tube 83 communicating with the interior of this cup. A bellows 91 or other suitable pressure responsive mechanism is located in cup 89 and has a plate 92 secured thereto at one end which is welded or otherwise secured in fluid tight relation to the housing wall at 93, and at the other end the bellows carries a collar 94 brazed or otherwise suitably secured thereto in fluid tight relation. A hollow bushing 95 has a reduced end 96 which fits into the collar 94 and is brazed or otherwise suitably secured thereto in fluid tight relation. It will be apparent that any change in volume of fluid in the bulb 82 due to changes in temperature of the liquid being metered, will cause movement of the bellows 91 and thus axially move the bushing 95 which is secured to one end thereof.

A flanged housing member 97 secured to the register case by screws 90' has a bore 98 at its tapered end. An adjustment screw retainer 99 has a sleeve 100 extending into bore 98 through which extends the adjustment screw 75 and the other end of the retainer is threaded at 101 to hold the adjustment rod. A flange 102 on the retainer is splined at its outer periphery and is received in an internally splined collar 103 located in bore 104 of housing 97. Collar 103 is held in position by a flanged collar retainer 105 held in assembled relation to housing 97 by screws 106 passing through flange 107 of the housing and flange 108 of the retainer, and is kept from rotating by a pin 112 extending through the collar 103 and retainer 105. One end of a weak spring 109 abuts a shoulder 110 formed by a bore 111 in the housing 97, the other end of the spring abutting the flange 102 of the rod retainer and urging the retainer 99 and adjusting rod 75 outward. Outward movement of rod retainer 99 is limited by a spring holder 114 located in the bore 115 of collar retainer 105. The spring holder has a hollow sleeve 116 therein which is held against removal by a retaining washer 117 held on an internal shoulder of the spring holder by turning over the end thereof as indicated at 120. The internal flange 121 on sleeve 116 abuts the end of bushing 95 and is held in abutting relation by a stiff spring 122 located within the spring holder 114 and abutting an internal flange 123 thereof at one end and the internal flange 121 of the sleeve 116 at the other end.

The operation of the thermal compensation mechanism is as follows:

When the bushing 95 moves inward in response to an increase in volume of the thermal fluid, it forces the piston or sleeve 116 inwardly, and motion of sleeve 116 is transmitted to the rod retainer 99 by the stiff spring 122. This urges the retainer and rod 75 inward against the resistance of spring 109 which is relatively weak. Spring 122 is stiff enough so that it is not deflected, the purpose of this spring being to prevent rupture of the bellows should the temperature exceed the limits for which the apparatus is intended. This movement of the rod 75 shifts the cam 54 carrying tracks 71 and 72 and changes its concentric or eccentric relation with respect to the driven shaft 22 and thus changes the extent of overdrive between the meter driven shaft 16 and the register driving shaft 22. When the volume of fluid surrounding the bellows shrinks due to a decrease in temperature, the spring 109 causes retainer 99 and rod 75 to follow the sleeve 95 as it moves to the right, thus restoring the position of cam 54 and tracks 71 and 72. It will be understood that the adjustment may be originally set so that at a standard temperature the cam tracks 71 and 72 are displaced about one half of their possible eccentricity, so that a corresponding amount of over-drive is provided. The preferred manner of adjustment is to provide such change gears between the meter and adjustment mechanism so that with the adjustment at concentric position the register runs slow for standard temperature, and then by manually adjusting the adjustment rod 75 the cam track is moved eccentrically to compensate for the slow drive until the register indicates accurately at standard temperature. This adjustment may be accomplished by removing the threaded plug 125 (Figure 2) at the end of the casing and inserting a screw driver in the kerf in the end of the collar 126 pinned by pin 127 to rod 75, and rotating the rod. Such adjustment is permitted by the thermal responsive means as the threads 130 on the rod passing through the stud 72a in the cam are of different pitch than threads 131 passing through retainer 99 in the thermal adjustment, so that a differential or micrometer adjustment is obtained.

Referring to the modification shown in Figures 8 to 11, wherein like parts are correspondingly numbered, there is shown a fragmentary section of a meter case 141 enclosing a metering mechanism of any suitable type and driving the driving shaft 142 passing through the stuffing box 143, a driving pinion 144 being suitably mounted on the end of the shaft. The pinion 144 drives a spur gear 145. The gear 145 fits over the hub 146 of a driving member 147 and is secured thereto by machine screws 148 or by any other suitable means. The driving member 147 and gear assembly is loosely rotatable on a stub shaft 149 which is suitably journalled in the meter casing.

The driving member 147 has a central depression 152 which receives a clutch drum having a cylindrical clutch wall 153 and a circular head 154 to which is secured the enlarged fluted end of driven shaft 155, a stub 156 thereon extending into and being loosely journalled in the hub 146. The other end of shaft 155 is journalled in any suitable manner in an intermediate plate 157. The table 147 carries an exterior or primary one way grip clutch designated generally by the numeral 161, which is secured thereto by screws 162 and 163. The clutch is constructed in any suitable manner, and in the preferred embodiment (Figures 9 and 10) comprises an annular middle disc 164 having recesses 165 in its inner periphery in which are located steel balls 166 urged inwardly by springs 167 in the recesses. The balls and springs are covered by two similar annular cover plates 168 and 169 which are riveted or otherwise secured to the middle plate 164, and have turned in portions 171 which prevent the balls 166 from falling out of the recesses. The arrangement is such that when the primary clutch turns counterclockwise, as seen Figure 10, the balls 166 will grip the drum 153 so that the drum and shaft 155 will rotate in unison with clutch 161.

Within the drum 153 is a secondary similar one way clutch assembly, designated generally by the numeral 172, and similarly constructed with portion 173 received in the tangential recesses 174 and urged outwardly by springs 175. The secondary clutch assembly 172 is freely rotatable on the driven shaft 155, and the arrangement of recesses therein is such that when the drum 153 is driven by the outer clutch 161 the clutch drum 153 idles over the balls 173 of the secondary clutch.

A compensator arm 176 is riveted or otherwise secured to secondary clutch assembly 172 and is rotatable therewith about driven shaft 155. A driven link 177 is pivotally secured at one end of primary clutch 161 by the shouldered screw 162, threaded into a suitable threaded bore 178 in the driving member 147, and an enlarged roller 179 is carried at the other end 180 of this link. The roller is secured to the top of the link 177 by a shouldered screw 181 with a suitable anti-friction washer interposed between the roller and end of the screw, and the rounded end 180 of the link engages the compensator arm 176. A spring 182 is coiled about the shouldered screw 163 threaded into a bore 183 in the driving member 147, and urges the link and compensator arm into contact, and a pin 184 threaded into a suitable bore 185 in the driving member 147 serves as a fulcrum to flex the spring. The spring 182 urges the compensator arm 176 against the rounded end 180 of the link 177, thereby urging the link 177 outwardly to maintain roller 179 at all times in engagement with circular track 186. When the track 186 is concentric with driven shaft 155, the roller 179 moves in a path concentric with the shaft 155 and, therefore, as the primary clutch 161 rotates the link 177, the angle subtended at the center of shaft 155 by pin 162, and the contact point of roller 179 with track 186 will be constant. Under this condition, the outer clutch 161 will rotate clutch drum 153 and will rotate inner clutch 172 by the pushing action of link 177 on arm 176 at the same speed, so that there is no relative angular movement between outer clutch 161 and inner clutch 172.

The intermediate plate 157 secured to the top of the meter case 141 has a central boss 188 in which driven shaft 155 is journalled, the shaft 155 directly driving a register (not shown) of any suitable construction, or by the interposition of suitable gearing. The plate has a threaded bore 189 and the movable circular track 186 is secured thereto by a shouldered screw 190 passing through a suitable bore in the flange 191 of the track into the bore 189, a spring 192 being interposed between the head of the screw and the flange to keep the track pressed against the central wall. Diametrically opposite, a stud 193 is suitably swivelly secured in a slot in the flange 191, the stud having a threaded bore 194 therethrough. This slot enables the stud 193 to be moved in a straight path while track member 186 is adjusted in an arcuate path about pin 190 as a pivot.

The thickened rim portion 195 of the intermediate plate has a horizontal threaded bore 196 and a threaded counterbore 197 therein, and adjustment rod 75 having a kerf in its end is threaded into the hole 194 in the stud 193 and is threaded for a part of its length extending through the bore 196. These threads are of different pitch so that a micrometer adjustment is secured. This rod 75 is preferably made of brass or other material having a high coefficient of thermal expansion so that changes in temperature of this rod will change its length and produce an adjustment of the register drive mechanism. The fluid to be measured by the meter, or a portion thereof, may be conducted in any suitable manner from the meter, as for example, through the pipe connection 199 to the chamber formed by wall 157 in which screw 75 is located, so that the rod 75 responds to the temperature of the fluid to be measured. A plug 198 is located in counterbore 197 and has a hole therethrough for the reception of a wire and lead seal.

The principle of operation of this modification is substantially like that heretofore described. When the track 186 is coincident with the driven shaft 155, the angle subtended at the center of shaft 155 by the screw 162 and contact point of roller 179 on cam track 186 remains constant. When the track 186 is eccentric with relation to the driven shaft 155 the angle will gradually increase and decrease in a periodic cycle, due to the roller 179 moving radially outward and the tendency of compensator arm 176 to follow the roller because of the bias of spring 182. In this modification, as the arm 176 is directly connected with the interior clutch 172, a decreasing angle produces an overdrive and an increasing angle permits the clutch drum to idle over the balls 173 of the secondary one way drive. The thermal expansion of rod 75 will adjust the track 186 in accordance with the temperature, and the track may be manually adjusted by removing the plug 198 and turning the rod 75 with a screw driver or other suitable tool.

Where the register or bellows are subject to ambient temperatures which would introduce an error into the adjustment mechanism, this error may be compensated by introducing a temperature compensating connection between the bellows and cam. This may conveniently be done as shown in Figure 12 by replacing the stud 73 by a square nut 201 having a threaded bore 202 therein to receive the rod 75, the nut being slidably held against rotation in the space between the cam flange 55 and top wall 20. A temperature responsive bi-metallic element 203 in the form of a U has one end soldered in a slot 204 at the end of the nut, the other end 205 being bifurcated to receive the rod 75 and one of the bifurcations being slidably received between two small pins 206 riveted into the cam flange 55. The mechanical connection between the square nut and cam 54 thus is made through the bi-metallic element, which is so adjusted and calibrated that movement of the rod 75 caused by ambient temperatures affecting the fluid surrounding the bellows will be taken up by deflection of the bi-metallic element under the same ambient temperature change and thus produce no movement of the cam. However, temperature changes in the fluid in the bulb will move the cam because they will not be counteracted by the bi-metallic element. If desired, the calibration of the bi-metallic element can be such as to compensate also for change in length of rod 75 or other parts of the apparatus due to ambient temperatures.

The invention may be embodied in other specific forms without departing from the spirit or essential characteristics thereof, and the present embodiment, therefore, is to be considered as illustrative merely of the invention.

Having described my invention, what I claim and desire to secure by Letters Patent is:

1. The combination comprising a register, a fluid flow responsive mechanism for measuring the flow of fluid therethrough, a plurality of one way drive means between said register and fluid flow responsive mechanism, a track providing an orbit to govern the movement of the one way drive means, and temperature responsive means for varying said track to correct for changes in temperature of the fluid being measured.

2. The combination comprising a casing, a fluid flow responsive mechanism in said casing, a register, fixed ratio means operated by said fluid flow responsive mechanism and operatively connected to said register, to continuously drive said register, one way drive means to intermittently overdrive said register when operated in one direction, and temperature responsive means for varying the extent of operation of the one way drive means.

3. The combination comprising a casing, a fluid flow responsive mechanism in said casing, a register, fixed ratio means operated by said fluid flow responsive mechanism and operatively connected to said register, a one way drive means to intermittently overdrive said register when operated in one direction, a guiding track for governing the movement of said one way drive means, and temperature responsive means for varying the position of said track.

4. The combination comprising a casing, a fluid flow responsive mechanism in said casing, a driving shaft driven thereby, a register, a driven shaft for driving the register, fixed ratio one way drive means operated by said driving shaft to drive said driven shaft, a second one way drive means to intermittently overdrive said driven shaft when turned in the operating direction of the fixed ratio one way drive means, a guiding track for governing the movement of said second one way drive means, and temperature responsive means for varying the position of said track.

5. The combination comprising a fluid flow responsive mechanism for measuring the flow of fluid therethrough, a register, a plurality of one way driving means between the register and said fluid flow responsive mechanism, orbit means for governing at least one of said one way driving means, and temperature responsive means for adjusting the axis of said orbit means to vary the extent of drive of the one way drive means.

6. The combination comprising a casing, a fluid flow responsive mechanism in said casing, a driving shaft driven thereby, indicating means, a driven shaft for operating said indicating means, means rotated by the driving shaft and having a fixed ratio driving engagement with the driven shaft, orbit means mounted on the casing, one way driving means actuated by said orbit means for imparting an intermittent impulse drive to said driven shaft, and temperature responsive means for adjusting the axis of the orbit means to vary the extent of impulse drive.

7. The combination comprising a mechanism responsive to flow of fluid therethrough, a driving shaft driven thereby, a register, a driven shaft for driving said register, a plurality of one way driving means between the driving shaft and driven shaft, means providing an orbit means, means carried with one of said one way driving means and guided by the orbit for governing the other of said one way driving means, and means responsive to the temperature of fluid passing through said mechanism for adjusting the axis of said orbit means to vary the extent of drive of the one way drive means.

8. The combination comprising a casing, a fluid flow responsive mechanism in said casing, a driving shaft driven thereby, a register, a driven shaft for driving the register, fixed ratio means operated by said driving shaft and operatively connected to the driven shaft, a one way drive means, means movable in an orbit for varying said one way drive means to impart an overdrive to said driven shaft, and means responsive to the temperature of the fluid being measured for varying the orbit of movement of said means.

9. The combination comprising a casing, a fluid flow responsive mechanism in said casing, a register, a multiple speed transmission having a fixed ratio means and a variable ratio means alternately driving said register, orbit means for controlling said variable ratio means, and temperature responsive means for varying said orbit means to change said variable ratio means.

10. The combination comprising a casing, a fluid flow mechanism in said casing, an indicator, a multiple speed transmission including a direct drive coupling said indicator and fluid flow responsive mechanism and rotated oscillatable means for varying said transmission, and temperature responsive means for varying the stroke of said oscillatable means.

11. The combination comprising a fluid meter, a register, a fixedly journalled register driving shaft, a second fixedly journalled coaxial shaft driven by the fluid meter, variable drive means coupling said shafts, orbit means for controlling said variable drive means, and temperature responsive means for shifting said orbit means to correct for changes in temperature of the fluid being measured.

12. The combination comprising a fluid meter, a register, means operated by the meter and operatively connected to said register, a one way drive means operated by the meter to drive said register when operated in one direction, a guiding track for governing the movement of said one way drive means, and temperature responsive means for varying the position of said track.

13. The combination comprising a casing, a fluid flow responsive mechanism in said casing, a register, variable drive means connected between said fluid flow responsive mechanism and said register, orbit means for varying said drive means, a threaded adjustment rod for varying the axis of said orbit means, a movable retainer into which said rod is threaded, spring means biasing said retainer and rod in one direction, temperature responsive means for varying said adjustment rod and yieldable means interposed between said temperature responsive means and said retainer for transmitting the action of the temperature responsive means to the variable drive means.

14. The combination comprising a register, fluid flow responsive mechanism, variable drive mechanism between said register and fluid flow responsive mechanism, a housing, a retainer in said housing, means holding said retainer against rotary movement, an adjustment rod connected to said variable drive mechanism and extending into said housing and threaded into said retainer, a spring biasing said rod and retainer in one direction, an expansible bellows, spring means interposed between said bellows and retainer, and temperature responsive means including a thermal expansive fluid for moving said bellows to adjust said variable drive mechanism.

15. The combination comprising a casing, a fluid flow responsive mechanism in the casing, a register, variable drive means connected between said flow responsive mechanism and said register, temperature responsive means, and transmitting means between said temperature responsive means and variable drive means comprising an adjustment rod, a movable retainer receiving said adjustment rod and guiding movement thereof, spring means biasing said retainer and rod in one direction, yieldable means interposed between the temperature responsive means and said retainer, and means for manually adjusting said variable drive means relative to said temperature responsive means.

16. The combination comprising a fluid meter, a register, a fixedly journalled register driving shaft, a second fixedly journalled coaxial shaft driven by the fluid meter, variable drive means coupling said shafts, orbit means for controlling said variable drive means, temperature responsive means for shifting said orbit means to correct for changes in temperature of the fluid being measured, and manually adjustable means for adjusting the position of said orbit means with relation to the temperature responsive means.

17. The combination comprising a register, a fluid flow responsive mechanism for measuring the flow of fluid therethrough, a plurality of one way drive means between said register and fluid flow responsive mechanism, a track providing an orbit to govern the movement of the one way drive means, temperature responsive means for varying said track to correct for changes in temperature of the fluid being measured, and manually adjustable means for adjusting the position of said track relative to the temperature responsive means.

18. The combination comprising a mechanism responsive to flow of fluid therethrough, a driving shaft driven thereby, a register, a driven shaft for driving said register, a plurality of one way driving means between the driving shaft and driven shaft, means providing an orbit, means carried with one of said one way driving means and controlled by the orbit for governing the other of said one way driving means, a movable rod for adjusting the axis of said orbit means, temperature responsive means including an expansible chamber containing a thermal expansible fluid connected to said rod for adjusting the position of said rod to vary the extent of drive of the one way drive means, and a spring biasing said rod in one direction.

19. The combination comprising a mechanism responsive to flow of fluid therethrough, a driving shaft driven thereby, a register, a driven shaft for driving said register, a plurality of one way driving means between the driving shaft and driven shaft, means providing an orbit, means carried with one of said one way driving means and controlled by the orbit for governing the other of said one way driving means, means responsive to the temperature of fluid passing through said mechanism for adjusting the axis of said orbit means to vary the extent of drive of the one way drive means, and manually operative means for adjusting said orbit means independently of said temperature responsive means.

20. The combination comprising a mechanism responsive to flow of fluid therethrough, a driving shaft driven thereby, a register, a driven shaft for driving said register, a plurality of one way driving means between the driving shaft and driven shaft, means providing an orbit, means carried with one of said one way driving means and guided by the orbit for governing the other of said one way driving means, means responsive to the temperature of fluid passing through said mechanism for adjusting the axis of said orbit means to vary the extent of drive of the one way drive means, and a second temperature responsive means interposed between said orbit means and said first temperature responsive means for correcting for ambient temperature changes.

21. In a fluid metering apparatus for measuring the volumes of liquids at predetermined base temperatures comprising in combination a displacement mechanism, a register, and an adjustable infinite ratio speed change mechanism connected to be driven by said displacement mechanism and connected to drive said register; a movable arm controlling the speed ratio of said speed change mechanism; a spring biased axially movable assembly slidably engaging said movable arm; thermostatic means responsive to the temperature of liquid being metered engaging and movable axially of said assembly; and means in said assembly located between said arm and said thermostatic means for adjusting said assembly to change the speed relationship of said speed change mechanism.

22. In combination with a fluid metering apparatus including a displacement mechanism, a register and a variable ratio speed change mechanism connected between said displacement mechanism and said register, a member controlling the speed ratio of said speed change mechanism, and means to actuate said last named member comprising thermostatic means subjected to the temperature of the fluid passing through said displacement mechanism and further thermostatic means subjected to the ambient temperature of the atmosphere surrounding the apparatus.

23. In combination with a fluid metering apparatus including a displacement mechanism, a register and a variable ratio speed change mechanism connected between said displacement mechanism and said register, a member controlling the speed ratio of said speed change mechanism, an element to operate said last named member, thermostatic means subjected to the temperature of the fluid passing through said displacement mechanism to operate said element, and further thermostatic means subjected to the ambient temperature of the atmosphere surrounding the apparatus to control said element whereby said element is responsive to temperature changes of the fluid alone.

24. In a metering system, a displacement mechanism; a register; a variable ratio speed change mechanism connected between said displacement mechanism and said register including track means to control said speed change mechanism; an axially movable rod slidably connected to said track means; means responsive to the temperature of the liquid passing through said displacement mechanism movable axially of and directly actuating said rod; and manually settable means to adjust the position of said track means, and said rod actuating means with relation to said rod.

25. In a fluid metering apparatus for measuring the volumes of liquids at predetermined base temperatures comprising in combination a displacement mechanism, a register, and an adjustable ratio speed change mechanism connected to be driven by said displacement mechanism and connected to drive said register; a movable arm controlling the speed ratio of said speed change mechanism; a slidable actuating rod slidably engaging said movable arm; resilient means urging said rod in one direction; thermostatic means responsive to the temperature of liquid being metered movable axially of and actuating said rod in opposition to said resilient means; and means for adjusting the speed relationship of said speed change mechanism with respect to the position of said thermostatic means.

26. In a measuring system of the type that comprises a casing, a meter, a speed change mechanism and a register in which the speed change mechanism has a rod shiftable with respect to the speed change mechanism to vary the speed of said mechanism, the combination with said rod of a spring to urge said rod in one direction, an adjustment between said rod and said speed change mechanism comprising a rotatable element accessible from the outside of the casing permitting metering registration during adjustment, and thermostatic means arranged to shift said rod in opposition to said spring in response to temperature variations of fluid passing through the meter.

WALTER H. MARSH.

REFERENCES CITED

The following references are of record in the file of this patent:

UNITED STATES PATENTS

| Number | Name | Date |
| --- | --- | --- |
| 2,156,812 | Hazard | May 2, 1939 |
| 2,059,547 | Brandl | Nov. 3, 1936 |
| 2,129,066 | McGogy | Sept. 6, 1938 |
| 1,881,572 | Herz | Oct. 11, 1932 |
| 1,978,362 | Fonseca | Oct. 23, 1934 |
| 2,206,540 | Whittaker | July 2, 1940 |
| 2,191,766 | Marsh | Feb. 27, 1940 |
| 2,093,151 | MacLean | Sept. 14, 1937 |
| 1,621,203 | Houghton | Mar. 15, 1927 |
| 1,608,231 | Bradley | Nov. 23, 1925 |
| 1,278,077 | Reeve | Sept. 3, 1918 |
| 1,794,612 | Halsey | Mar. 3, 1931 |
| 585,711 | Smith | July 6, 1937 |
| 1,515,810 | Giesler | Nov. 18, 1924 |
| 1,453,769 | Sandvoss | May 1, 1923 |
| 2,141,520 | Dube | Dec. 27, 1938 |
| 2,055,280 | Dodson | Sept. 22, 1936 |
| 2,302,529 | Cornell et al. | Nov. 17, 1942 |
| 2,208,687 | Renfrew | July 23, 1940 |
| 2,222,551 | Ziebolz et al. | Nov. 19, 1940 |

FOREIGN PATENTS

| Number | Country | Date |
| --- | --- | --- |
| 493,202 | Great Britain | Oct. 5, 1938 |